(12) United States Patent
Drier et al.

(10) Patent No.: US 11,865,642 B2
(45) Date of Patent: Jan. 9, 2024

(54) ADDITIVE MANUFACTURED FERROUS COMPONENTS

(71) Applicant: Rolls-Royce Corporation, Indianapolis, IN (US)

(72) Inventors: Brian Drier, Indianapolis, IN (US); Amanda Dawn Graham, Shelbyville, IN (US); Robert Frederick Proctor, Carmel, IN (US); Quinlan Yee Shuck, Indianapolis, IN (US); Jacque Sue Bader, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 347 days.

(21) Appl. No.: 17/016,040

(22) Filed: Sep. 9, 2020

(65) Prior Publication Data

US 2021/0078108 A1   Mar. 18, 2021

Related U.S. Application Data

(60) Provisional application No. 62/900,008, filed on Sep. 13, 2019.

(51) Int. Cl.
*B23K 26/342* (2014.01)
*B33Y 10/00* (2015.01)
(Continued)

(52) U.S. Cl.
CPC ........ *B23K 26/342* (2015.10); *B23K 26/0006* (2013.01); *B23K 26/08* (2013.01);
(Continued)

(58) Field of Classification Search
CPC .. B23K 26/342; B23K 26/0006; B23K 26/08; B23K 26/144; B23K 26/1464;
(Continued)

(56) References Cited

U.S. PATENT DOCUMENTS

| | | | |
|---|---|---|---|
| RE29,815 E | 10/1978 | Gnanamuthu | |
| 2011/0285091 A1* | 11/2011 | Wodrich | B22D 19/08 277/377 |

(Continued)

FOREIGN PATENT DOCUMENTS

| | | |
|---|---|---|
| DE | 10039144 C1 | 11/2001 |
| EP | 2745979 A1 | 6/2014 |

(Continued)

OTHER PUBLICATIONS

Response to Extended Search Report dated Nov. 5, 2020, from counterpart European Application No. 20194728.0, filed Sep. 14, 2021, 55 pp.

(Continued)

*Primary Examiner* — John A Hevey
(74) *Attorney, Agent, or Firm* — Shumaker & Sieffert, P.A.

(57) ABSTRACT

A method of forming a ferrous metal case-hardened layer using additive manufacturing. The method includes delivering, by a material delivery device, a filler material to a surface of a substrate. The substrate includes a first ferrous metal. The filler material includes a second ferrous metal and a carbon-based material. The method also includes directing, by an energy delivery device, an energy toward a volume of the filler material to join at least some of the filler material to the substrate to form a component.

17 Claims, 3 Drawing Sheets

(51) Int. Cl.

| | |
|---|---|
| *B33Y 30/00* | (2015.01) |
| *B23K 26/144* | (2014.01) |
| *B33Y 70/10* | (2020.01) |
| *B23K 26/00* | (2014.01) |
| *B23K 26/08* | (2014.01) |
| *B23K 26/14* | (2014.01) |
| *C22C 38/44* | (2006.01) |
| *C22C 38/46* | (2006.01) |
| *C22C 38/52* | (2006.01) |
| *B23K 103/00* | (2006.01) |
| *B23K 103/02* | (2006.01) |

(52) U.S. Cl.
CPC ........ *B23K 26/144* (2015.10); *B23K 26/1464* (2013.01); *B33Y 10/00* (2014.12); *B33Y 30/00* (2014.12); *B33Y 70/10* (2020.01); *C22C 38/44* (2013.01); *C22C 38/46* (2013.01); *C22C 38/52* (2013.01); *B23K 2103/02* (2018.08); *B23K 2103/50* (2018.08)

(58) Field of Classification Search
CPC .. B23K 2103/02; B23K 2103/50; B23K 9/04; B23K 10/027; B23K 15/0086; B23K 35/3053; B23K 35/3066; B23K 35/38; B33Y 10/00; B33Y 30/00; B33Y 70/10; C22C 38/44; C22C 38/46; C22C 38/52; C22C 33/0207; C22C 33/0228; C22C 33/0264; C22C 38/04; C22C 38/58; B22F 2999/00; B22F 7/008; B22F 10/25; B22F 7/08; B22F 2201/30; B22F 7/062; B22F 2007/068

See application file for complete search history.

(56) References Cited

U.S. PATENT DOCUMENTS

| | | | |
|---|---|---|---|
| 2014/0021187 A1* | 1/2014 | Denney | B23K 35/327 |
| | | | 219/146.51 |
| 2017/0114439 A1* | 4/2017 | Altraide | C23C 4/12 |
| 2017/0368647 A1* | 12/2017 | Bunker | B23P 6/045 |
| 2018/0297119 A1* | 10/2018 | Clarke | F16H 1/28 |
| 2020/0230746 A1* | 7/2020 | Jin | C22C 32/0073 |

FOREIGN PATENT DOCUMENTS

| | | |
|---|---|---|
| EP | 3178585 A1 | 6/2017 |
| WO | 2014040215 A1 | 3/2014 |

OTHER PUBLICATIONS

Katsamas et al., "Laser-beam carburizing of low-alloy steels", Surface and Coatings Technology 139 (2001) 183-191, Aug. 30, 2000, 9 pgs.

Extended European Search Report from counterpart EP Application No. 20194728.0 dated Nov. 5, 2020, 24 pgs.

Schneider et al., "Introduction to Surface Hardening of Steels", ASM Handbook, vol. 4A, Jan. 1, 2013, 10 pgs.

Griffith et al., "Multi-Material Processing by Lens", Dec. 31, 1997, 8 pgs.

Gallo et al., "In-situ synthesis of titanium carbides in iron alloys using plasma transferred arc welding", Surface & Coating Technology 225 (2013) 79-84, Mar. 26, 2013, 6 pgs.

Communication pursuant to Article 94(3) EPC from counterpart European Application No. 20194728.0 dated Apr. 4, 2023, 9 pp.

Li et al., "Laser cladding in-situ NbC particle reinforced Fe-based composite coatings with rare earth oxide addition", Surface and Coatings Technology, vol. 239, No. 25, Jan. 2014, pp. 102-107.

Response to Communication pursuant to Article 94(3) EPC dated Apr. 4, 2023, from counterpart European Application No. 20194728.0 filed Aug. 8, 2023, 52 pp.

* cited by examiner

ADDITIVE MANUFACTURED FERROUS COMPONENTS

This application claims the benefit of U.S. Provisional Application Ser. No. 62/900,008, entitled "ADDITIVE MANUFACTURED FERROUS COMPONENTS," and filed on Sep. 13, 2019, the entire content of which is incorporated herein by reference.

TECHNICAL FIELD

The disclosure relates to additive manufacturing techniques, in particular, to additive manufacturing of ferrous components.

BACKGROUND

Additive manufacturing may generate three-dimensional structures through addition of material layer-by-layer or volume-by-volume to form the structure, e.g., rather than removing material from an existing volume to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

The disclosure describes example techniques, systems, and materials for additive manufacturing to form and repair ferrous components.

In some examples, the disclosure describes example methods that include delivering, by a material delivery device, a filler material to a surface of a substrate. The substrate includes a first ferrous metal. The filler material includes a second ferrous metal and a carbon-based material. The method also includes directing, by an energy delivery device, an energy toward a volume of the filler material to join at least some of the filler material to the substrate to form a component.

In some examples, the disclosure describes example additive manufacturing system that includes an energy delivery device, a material delivery device, and a computing device. The computing device is configured to control the material delivery device to deliver a filler material to a surface of a substrate. The substrate includes a first ferrous metal. The filler material includes a second ferrous metal and a carbon-based material. The computing device also is configured to control the energy delivery device to direct an energy beam toward a volume of the filler material to join at least some of the filler material to the substrate to form a component.

In some examples, the disclosure describes example components that includes a substrate defining a surface and a layer of filler material deposited directly on the surface of the substrate. The substrate includes a first ferrous metal. The filler material includes a second ferrous metal and carbon from a carbon-based material.

The details of one or more examples are set forth in the accompanying drawings and the description below. Other features, objects, and advantages will be apparent from the description and drawings, and from the claims.

DETAILED DESCRIPTION

The disclosure generally describes systems and techniques for forming additively manufactured ferrous metal components, restoring worn or damaged ferrous components, or both.

Ferrous metals may have suitable mechanical properties including strength, endurance limit, wear resistance, and toughness are used to form various components, such as structural components, shafts, gears, bearings, and transmissions. In some examples, mechanical properties of ferrous metal components, such as hardness, may be enhanced by case-hardening. Case-hardening, e.g., the process of hardening a surface layer of a ferrous metal while allowing the subsurface metal to remain soft relative to the surface layer, may be achieved by carburizing and/or nitriding. In operation, ferrous metal component surfaces may deteriorate due to operating conditions. For example, surfaces of ferrous metal gear teeth, splines, bearings, or the like may wear. To restore worn surfaces, case-hardened ferrous components may be machined down to remove the damaged surface. However, machining alone may be limited by an amount of material that can be removed before the component is no longer usable. Moreover, machining may remove portions of a ferrous metal component that are case-hardened.

In accordance with some examples of the disclosure, to restore a damaged ferrous component, the damaged substrate material may be locally machined off to remove irregular surface conditions. After machining, a filler material may be deposited onto the surface of the machined substrate by an additive manufacturing process, such as, e.g., laser directed energy deposition additive manufacturing. To build a repair portion, the filler material, including a metal or alloy and a carbon-based material, may be directed toward the surface of the substrate and an energy source may be directed toward the surface of the substrate to heat the substrate and/or filler material to join at least a portion of the filler material to the surface of the substrate. In some examples, the deposited filler material may define a case-hardened material layer. In some examples, rather than repairing a damage area of a component, the technique may be used to form entire case-hardened ferrous components or features of case-hardened ferrous components.

Figure 1A:
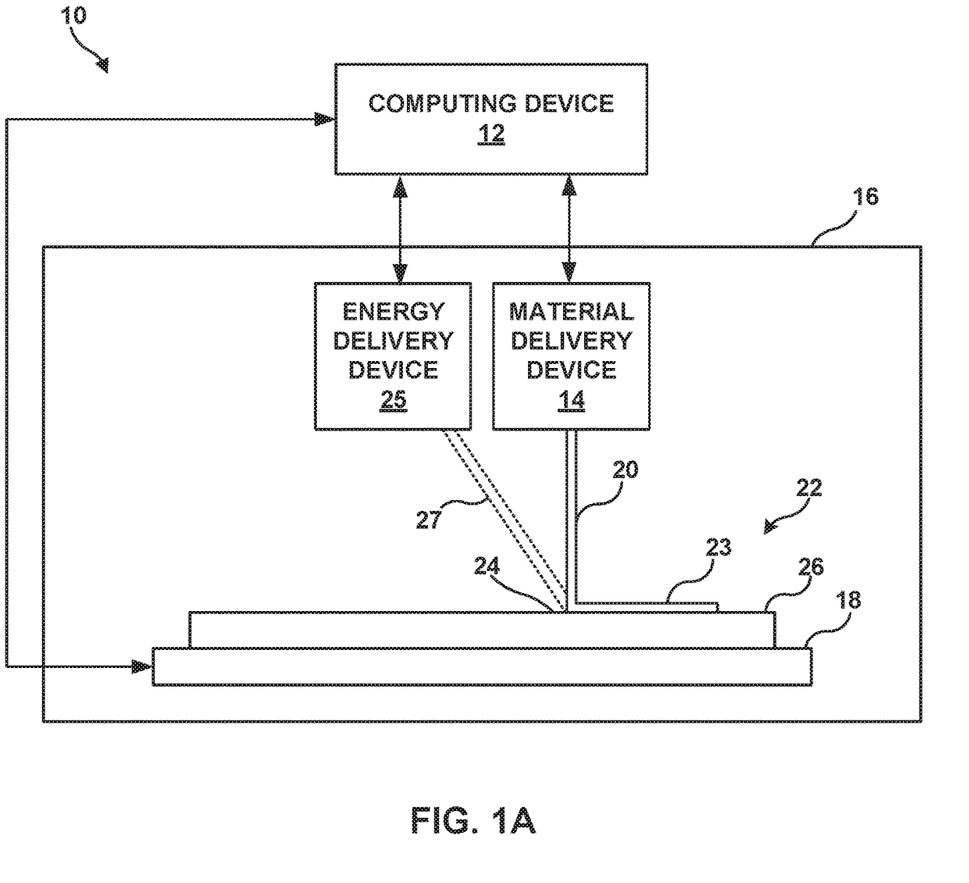
FIG. 1A is a conceptual block diagram illustrating an example additive manufacturing system for additive manufacturing to form or repair an example component.
Figure 1B:
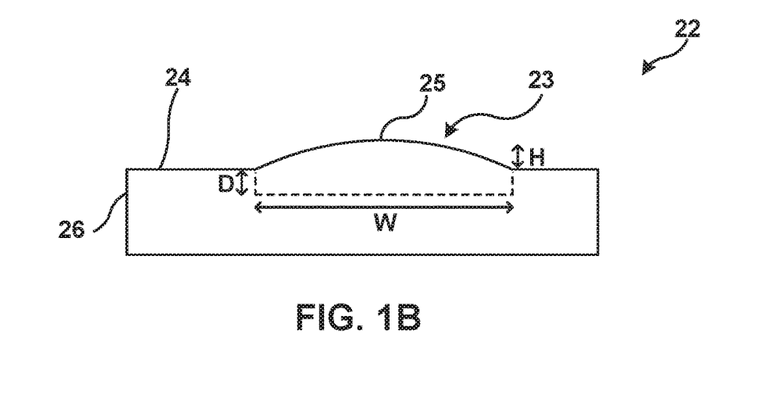
FIG. 1B is a schematic diagram illustrating a portion of the example component of FIG. 1A.

FIG. 1A is a conceptual block diagram illustrating an example additive manufacturing system 10 for additive manufacturing to form or repair component 22. FIG. 1B is a schematic diagram illustrating component 22 of FIG. 1A. System 10 may include, for example, a powder bed fusion additive manufacturing system or a direct energy deposition additive manufacturing system. System 10 may include a computing device 12, material delivery device 14, energy delivery device 25, an enclosure 16, a stage 18, and component 22.

Computing device 12 may include, for example, a desktop computer, a laptop computer, a workstation, a server, a mainframe, a cloud computing system, a tablet, a smart phone, or the like. Computing device 12 is configured to control operation of additive manufacturing system 10, including, for example, material delivery device 14, energy delivery device 25, and/or stage 18. Computing device 12 may be communicatively coupled to material delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Component 22 may include any structure formed by additive manufacturing or to which material is added using additive manufacturing, e.g., where the added material is used to repair a damaged portion of component 22. In some examples, component 22 may include a ferrous metal component. Component 22 may include structural features and geometry of any size and/or shape. In some examples, component 22 may include a component of a mechanical system, a shaft, a gear, a bearing component, or transmission component.

Component 22 may be formed of any material to which material may be added using additive manufacturing. In some examples, component 22 may be formed of a metal suitable for case-hardening, an iron-based alloy, carbon steel, alloy steel, or the like. For example, component 22 may be formed of one or more of steel alloys 9310, X53, 4340, M50, or M50-NiL; AerMet 100 available from Carpenter Technology Corporation, Philadelphia, Pennsylvania; Pyrowear 53 available from Carpenter Technology Corporation, Philadelphia, Pennsylvania; Maraging 250 available from Universal Stainless, Bridgeville, Pennsylvania; or a steel composition containing between about 0.01% to about 1.5% carbon, between about 0.01% to about 15.0% chromium, between about 0.1% about 20% cobalt, between about 0.1% to about 2% manganese, between about 0.1% to about 8% molybdenum, between about 0.1% to about 25% nickel, and between about 0.1% to about 2% vanadium.

Component 22 may be fabricated using any suitable technique for manufacturing metal or alloy components. For example, component 22 may be fabricated using at least one of casting, molding, stamping, cutting, punching, milling, etching, welding, or other metal working techniques. In one example, component 22 may be fabricated using additive manufacturing. For example, additive manufacturing may be used to deposit a plurality of layers of a material, each layer of the plurality of layers having a predetermined two-dimensional geometry. The plurality of layers may be stacked to provide a predetermined three dimensional geometry to component 22 by material addition. While additive manufacturing may be used to fabricate component 22, additive manufacturing may also be used to modify or repair component 22, for example, a damaged part of component 22.

Damage to component 22, for example, damage that affects geometry or mechanical properties of features or regions of component 22, may affect the performance of component 22 as a whole, and thus may need to be repaired.

In some examples, even if component 22 is not damaged, component 22 may be modified due to changes in specifications or design parameters, or because of changes in the environment in which component 22 is to be deployed. Additive manufacturing may be used to repair or modify component 22. However, material addition at a region of component 22 may affect the mechanical properties of the material in the region of component 22. For example, prior to the material addition, component 22 may be case-hardened near an exterior surface of component 22. Example systems and techniques according to the disclosure may be used to form or repair component 22, the repaired or modified region having a selected case-hardening.

In some examples, component 22 includes substrate 26. For example, substrate 26 may define a portion of component 22. For example, where substrate 26 defines a damaged portion of component 22. In other examples, substrate 26 may define a build plate on stage 18 on which component 22 is built. For example, where component 22 is formed on a support structure defined by substrate 26. In some examples, system 10 may not include a separate substrate 26, and softened or melted filler material 20 may be deposited on a build surface defined by stage 18, or on another component, or on layers of prior deposited, softened, or melted filler material 20 or another material.

In some examples, computing device 12 may be configured to control a position or movement of stage 18, substrate 26, or both, relative to material delivery device 14 and/or energy delivery device 25. For example, computing device 12 may control movement of stage 18 in one or more axes (e.g., three orthogonal axes along which stage 18 can translate, five axes along which stage 18 can translate and rotate, six axes along which stage 18 can translate and rotate, or the like).

Computing device 12 may be configured to control material delivery device 14 to delivery filler material 20 to surface 24 of substrate 26. For example, material delivery device 14 may include one or more delivery ports or delivery nozzles configured to deliver filler material 20 to surface 24 or a location of component 22 being formed. Computing device 12 may control the position and orientation of material delivery device 14 and/or a flux of filler material 20, for example, by controlling an industrial robot, a movable platform, or a multi-axis stage that supports material delivery device 14.

Filler material 20 may include a metal or alloy and a carbon-based material. The metal or alloy of the filler material 20 may be supplied by material delivery device 14 in a powder form or a wire form (which may also be referred to a filament or wire filament). The carbon-based material of filler material 20 may be supplied with the metal or alloy or separately from the metal or alloy by material delivery device 14 in a powder form, a compacted form, or a gaseous form. During or after delivery of filler material 20 to surface 24, energy 27 delivered by energy delivery device 25 may heat substrate 26 and/or filler material 20 to form a melt pool on surface 24 and/or soften or melt at least a portion of filler material 20 to join at least some of filler material 20 to substrate 26. In some examples, material delivery device 14 may include a plurality of material delivery devices. For example, material delivery device 14 may include a first material delivery device configured to deliver filler material 20 to the location of component 22 being formed and a second material delivery device configured to deliver the carbon-based material to the location of component 22 being formed.

In some examples, system 10 may be a blown powder directed energy deposition additive manufacturing system. For example, material delivery device 14 may deliver powdered filler material 20 adjacent to surface 24 by blowing the powder adjacent to surface 24. In some examples, powdered filler material 20 may be blown as a mixture of the powder with a gas carrier. Thus, in some examples, material delivery device 14 may be fluidically coupled to a powder source and a gas source. In some examples, the carrier gas may include the carbon-based material of filler material 20 in the form of a carbonaceous gas, such as natural gas, methane, ethane, or acetylene. Material delivery device 14 may include one or more nozzles or other mechanisms for directing powdered filler material 20 to the location of component 22 being formed. In some examples, material delivery device 14 may be mechanically coupled or attached to energy delivery device 25 to facilitate delivery of powder and energy 27 for heating powdered filler material 20 to join filler material 20 the location of component 22 being formed.

In some examples, computing device 12 may control a flux of filler material 20 by controlling a powder delivery standoff distance. Standoff distance may include a distance from the lowest point of a delivery nozzle parallel to the gravitational vector to the surface of component 22. In some examples, a powder delivery nozzle standoff distance may influence filler material 20 flux falling on a given area of the molten pool per unit time, as the powder stream exiting the delivery nozzle may diverge as the powder exits the nozzle. In some examples, the powder delivery nozzle standoff distance may be within a range from about 0.01 inches and about 10 inches, such as about 0.05 inches and about 4 inches. In some examples, the powder feed rate may be maintained between about 0.1 g/min and about 20 g/min. For example, the delivery standoff distance may depend on the angle of the stream of filler material 20 symmetry axis relative to the surface of component 22, the powder delivery nozzle exit hole diameter, and/or the angle of divergence of the streams of filler material 20 exiting the powder delivery nozzle. In some examples, material delivery device 14 may include a plurality of nozzles such that filler material 20 having a converging profile is delivered by material delivery device 14. For example, each nozzle of the plurality of nozzles may be substantially directed towards a target delivery zone.

In some examples, system 10 may be a powder bed additive manufacturing system. For example, material delivery device 14 may deliver powdered filler material 20 adjacent to surface 24 of substrate 26 by spreading powdered filler material 20 on surface 24, such that powdered filler material 20 rests on surface 24 prior to being heated. In some examples of a powder bed additive manufacturing system, material delivery device 14 may include a device that spreads powdered filler material 20 or can otherwise manipulate powdered filler material 20 to move powdered filler material 20 within system 10.

In some examples, system 10 may include a wire filament additive manufacturing system. For example, material delivery device 14 may include one or more reels or reservoirs holding wire filler material 20 configured to deliver wire filler material 20 on to surface 24 of substrate 26. In examples in which the material delivery devices include a filament reel, computing device 12 may control material delivery device 14 to advance the respective filament of wire filler material 20 from the reel and heat the respective filament to above a softening or melting point of the composition. In some examples, wire filler material 20 may include a coating or a layer that included the carbon-based material. In some examples, material delivery device 14 may be configured to deliver both wire filler material 20 and a powdered or a gaseous carbon-based material to surface 24.

Regardless of the type of material delivery device 14, material delivery device 14 is configured to deliver filler material 20 to surface 24 of substrate 26. In some examples, filler material 20 (e.g., the metal or alloy of filler material 20) may include a composition substantially the same as (e.g., the same or nearly the same as) the composition of the material from which component 22 is formed. In other examples, filler material 22 may include a composition different from the composition of the material from which component 22 is formed.

The metal or alloy of filler material 20 may include any suitable ferrous metal or ferrous alloy for forming component 22. For example, component 22 may include a high-performance metal or alloy component used in mechanical systems, such as drive shafts, gears, bearings, or the like. In some examples, the metal or alloy of filler material 20 may include a metal suitable for case-hardening, an iron-based alloy, a steel, a carbon steel, an alloy steel, or the like. For example, the metal or alloy may include one or more of steel alloys 9310, X53, 4340, M50, or M50-NiL; AerMet 100 available from Carpenter Technology Corporation, Philadelphia, Pennsylvania; Pyrowear 53 available from Carpenter Technology Corporation, Philadelphia, Pennsylvania; Maraging 250 available from Universal Stainless, Bridgeville, Pennsylvania; or a steel composition containing between about 0.01 weight percent (wt %) to about 1.5 wt % carbon, about 0.01 wt % to about 15.0 wt % chromium, about 0.1 wt % about 20 wt % cobalt, about 0.1 wt % to about 2 wt % manganese, about 0.1 wt % to about 8 wt % molybdenum, about 0.1 wt % to about 25 wt % nickel, and about 0.1 wt % to about 2 wt % vanadium.

In some examples, the metal or alloy may include one or more alloying additions ("additives") such as one or more of C, Cr, Co, Mn, Mo, Ni, N or V. In some examples, the additives may be between about 0.01 wt % and about 10 wt % of the metal or alloy of filler material 20. The additives may, in some examples, improve a hardenability of filler material 20. In some examples, system 10 may be configured to control a percentage of an additive mixed with filler material 20. For example, computing device 12 may be configured to control a feed rate of the additive from one or more hoppers containing the additive to material delivery device 14. In some examples, the percentage of the additive mixed with filler material 20 may affect the microstructure, mechanical properties, or hardness of deposited filler material 20.

In some examples, the carbon-based material of filler material 20 may include any suitable solid, liquid, or gaseous carbon-based material. The carbon-based material may be configured to pyrolyze or otherwise convert to pure carbon that may be integrated with the metal or alloy of filler material 20 during the deposition process. In some examples, the carbon-based material may include graphite, such as a graphite powder. For example, the carbon-based material may include powder carbon within a range from about 1 wt % to about 5 wt %, or about 2.5 wt %, relative to the weight of the filler material. In some examples, the carbon-based material may include a carbonaceous gas, such as, for example, natural gas, methane, ethane, acetylene, or one or more carbon containing gases. In some examples, the carbon-base material may be between about 0.5 wt % to about 10 wt % of filler material 20.

In some examples, system 10 may be configured to control an amount of the carbon-based material mixed with the metal or alloy of filler material 20. For example, computing device 12 may be configured to control a feed rate of the carbon-based material from one or more hoppers containing the carbon-based material to material delivery device 14. In some examples, the amount of the carbon-based material mixed with the metal or alloy of filler material 20 may affect the microstructure, mechanical properties, or hardness of deposited filler material 20. In this way, system 10 may be configured to deposit a plurality of tracks 23 ("tracks 23") and/or layers of tracks 23 having selected hardness based, at least in part, on carbon content.

In some examples, the metal or alloy and the carbon-based material of filler material 20 may be selected to have a selected case-hardness after additive manufacturing and, in some examples, optional heat treatment (as discussed below). For example, the metal or alloy and the carbon-based material of filler material 20 may be selected to have a case-hardness between about 45 Rockwell C scale hardness (HRC) to about 75 HRC, such as about 55 HRC to about 65 HRC. In some examples, computing device 12 may individually control a flux of the metal or alloy of filler material 20 and the carbon-based material of filler material 20, for example, by controlling a powder feed rate of at least one of the metal or alloy of filler material 20 and the carbon-based material of filler material 20, to vary a hardness of the deposited filler material 20. In order to achieve the targeted hardness, additives such as C, Cr, Co, Mn, Mo, Ni, N or V may be added to a powder composition in order to improve hardenability of tracks 23.

Energy delivery device 25 may include source of energy 27, such as a laser source, an electron beam source, plasma source, or another source of energy 27 that may be absorbed by filler material 20 to be added to component 22. Example laser sources include a CO laser, a $CO_2$ laser, a Nd:YAG laser, or the like. In some examples, energy delivery device 25 may be selected to deliver energy with a predetermined wavelength or wavelength spectrum that may be absorbed by filler material 20 to be added to component 22 during the additive manufacturing technique.

In some examples, energy delivery device 25 also includes an energy delivery head (not shown), which is operatively connected to energy delivery device 25. The energy delivery head may aim or direct energy 27 toward predetermined positions adjacent to component 22 during the additive manufacturing technique. Computing device 12 may control various parameters of energy delivery device 25, including the instantaneous power, peak power or intensity, power pulsing, average beam power, a peak beam power density, a beam heat input, travel speed, wavelength, direction, and orientation of the energy delivery head.

In some examples, system 10 includes enclosure 16, which at least partially encloses energy delivery device 25, material delivery device 14, stage 18, and substrate 26. Enclosure 16 may provide physical protection to energy delivery device 25, material delivery device 14, stage 18, and substrate 26 during operation of additive manufacturing system 10, may maintain an atmosphere within enclosure 16 in a desired state (e.g., filled with an inert gas, filled with a carbonaceous gas, under vacuum, or maintained at a desired temperature), or the like. In some examples, enclosure 16 may define a furnace or another thermal chamber or environment in which any predetermined temperature may be maintained. For example, enclosure 16 may include thermally insulative walls, and energy delivery device 25 within enclosure 16 may provide a source of heat to cause an interior of enclosure 16 to be heated to the predetermined temperature. The source of heat may include, for example, one or more heating elements or coils may be disposed in or on walls of enclosure 16 to cause an interior of enclosure 16 to be heated to the predetermined temperature. The predetermined temperature may be controlled to control a cooling rate of the deposited filler material 20.

Computing device 12 is configured to control deposition of filler material 20 onto surface 24 to form tracks 23 on surface 24. Computing device 12 may control movement of material delivery device 14, stage 18, or both, based on a computer aided manufacturing or computer aided design (CAM/CAD) file, for example, to trace a pattern or a shape to form a layer including tracks 23. For example, energy 27 may transform one or more of a physical state, a composition, ionization, or another property of one or both of substrate 26 and filler material 20 along the first path leading to the deposition of track 23 on surface 24. In some examples, energy 27 may melt surface 24 of substrate 26 along the first path to form a molten portion or molten pool. Material delivery device 14 may deliver filler material 20 to the molten portion, where the material may melt in the molten portion to form a combined molten composition, which may solidify to form track 23. Thus, energy 27 may transform material from filler material 20 into a sintered, fused, or molten state by contact with the molten pool. In some examples, energy 27 may be directly incident on a portion of filler material 20 and may directly fuse or melt the portion of filler material 20 before it is deposited on surface 24. In some examples, material from one or both of filler material 20 or substrate 26 may only melt or fuse within a focal region or substantially near a focal region of energy 27. For example, material delivery device 14 may deliver filler material 20 along a first path, and computing device 12 may focus energy 27 from energy source onto component 22 and filler material 20, so that component 22 and filler material 20 along the first path simultaneously melt to form a molten region. Thus, in some examples, track 23 may be formed substantially along the first path.

As illustrated in FIG. 1B, tracks 23 may have a width W, a depth D, and an actual height H. The depth D of the molten pool may be measured within a subsurface region immediately adjacent surface 24 of substrate 26. Actual height H of tracks 23 may be measured as a distance between surface 24 of substrate 26 and a track surface of first raised track 23. For example, track 23 may exhibit a curved surface 25 in a direction transverse the first path, and the curved surface may exhibit a peak at or adjacent a center of track 23.

Computing device 12 may use at least one of control energy delivery device 25, material delivery device 14, and stage 18 to deposit a series of tracks on component 22. Thus, in some examples, a layer deposited on component 22 may include a plurality of tracks 23, and the plurality of tracks 23 may include a first track and a second track adjacent the first track. Adjacent tracks 23 may be side-by-side or layered. In some examples, adjacent tracks 23 (side-by-side) may define a hatch spacing. The hatch spacing may include a distance between a center point of width W of each track 23. In some examples, the hatch spacing between a first track and an adjacent second track may be less than about 80% of width W of the first track. In some examples, width W of track 23 may be less than 500% of a thickness of substrate 26, such as less than about 400% of the thickness of substrate 26 or less than about 140% the thickness of substrate 26. In some examples, height H of track 23 may be less than 1000% of a depth D of a melt-pool formed by energy delivery device 25 ("melt-pool depth"). In some examples, a ratio of track height H to a melt-pool depth D may be within a range from about 0.2 to about 4, such as about 0.6 to about 2 or about 1 to about 1.4.

Computing device 12 may control various dimensions of tracks 23, including W, D, and H of track 23, for example, based on a target hardness of track 23. For example, computing device 12 may control one or more of pause time, hatch spacing, average beam power, peak beam power density, beam heat input, a ratio of a molten pool depth to the nominal height, material flux of the material, or displacement between the beam spot and the first path may deviate from their target ranges. The target height of track 23 may depend on the intended thickness of a layer to be ultimately deposited by example system 10 using additive manufacturing on substrate 26.

Computing device 12 may control a cooling rate of tracks 23 by controlling one or more of energy delivery device 25, material delivery device 14, and stage 18, for example, by allowing one track of tracks 23 to cool before depositing an adjacent track of tracks 23. For example, computing device 12 may control a pause time between forming a first track and forming a second track that is adjacent to the first track to control the cooling rate of the first track and/or second track. In some examples, computing device 12 may control a hatch spacing between a first track and a second track. The hatch spacing may be the spacing between the first path and the second path (e.g., leading to the deposition of the second track), or the minimum spacing between the respective centers of the first track and the second raised track, or the minimum spacing between respective crests or peaks of the first track and the second track. In some examples, the hatch spacing may be the minimum spacing between the paths of two successively deposited tracks of tracks 23.

In some examples, one or both of controlling the pause time and controlling the hatch spacing may regulate a molten pool temperature and/or a subsurface temperature of a subsurface region of substrate 26 (e.g., in a region of substrate 26 that may be heated by the molten pool). For example, increasing the pause time may allow the first track and portions of substrate 26 near the first track to cool before the second track is formed, and reducing the pause time may allow the first track and portions of substrate 26 near the first track to maintain heat while the second track is formed. In some examples, increasing the hatch spacing may reduce heat transfer between a region adjacent the first track and a region adjacent the second track, and reducing the hatch spacing may increase heat transfer between a region adjacent the first track and a region adjacent the second track. For example, increasing the hatch spacing may increase a distance between the first track and the second track, thus increasing a volume of material of substrate 26 available to dissipate heat, reducing the effective temperature increase of the portion of substrate 26 near the second track due to heat from the first track. Thus, the pause time and the hatch spacing may affect the extent to which a region adjacent the first track may draw heat from or contribute heat to a region adjacent the second track, for example, at least one of a molten pool formed along the second track, a subsurface temperature of a subsurface region adjacent the second track, or a surface temperature of a surface region adjacent the second track.

Computing device 12 may control material delivery device 14, energy delivery device 25, and/or stage 18 to move substrate 26 away from material delivery device 14, then control material delivery device 14, energy delivery device 25, and/or stage 18 to trace a second pattern or shape to form a second layer including a plurality of tracks on the first layer. Computing device 12 may control material delivery device 14, energy delivery device 25, and/or stage 18 in this manner to result in a plurality of layers, each layer including a traced shape or design. Together, substrate 26 with one or more layers of tracks 23 of filler material 20 defines an additively manufactured component 22.

After computing device 12 has controlled material delivery device 14 to deposit one or more layers of additively manufactured component 22 (e.g., from a plurality of adjacent tracks 23), or after the complete component 22 is formed by additive manufacturing, the component may be subjected heat treatment. In some examples, heat treatment may include one or more of a bulk heat treatment or a localized heat treatment configured to provide selected material properties. Bulk heat treatments may include but are not limited to carburizing, nitriding, austenitzing, quenching, stabilizing, and tempering. Localized heat treatments may include but are not limited to induction hardening or directed laser hardening. In some examples, heat treating may include sintering, e.g., a two-step heating process, each step of the two-step heating process selected based on a composition of filler material 20. In some examples, heat treatment may be selected based on a criticality of the rebuilt area to its application, necessary material properties after repair, and tolerance of component 22, e.g., substrate 26, to distortion that may occur during a repair process.

In some examples, after deposition of filler material 20 and optional heat treatment, component 22 may be machined, plated, or coated (e.g., via thermal spraying) to restore dimensional conformance to component 22, surface finish conformance to component 22, or both. For example, machining, plating, or coating may be used to define a final shape of component 22. Surface finishing, such as, for example, shot peening, laser shock peening, and isotropic super-finishing, may provide a finished surface on component 22.

Figure 2A:
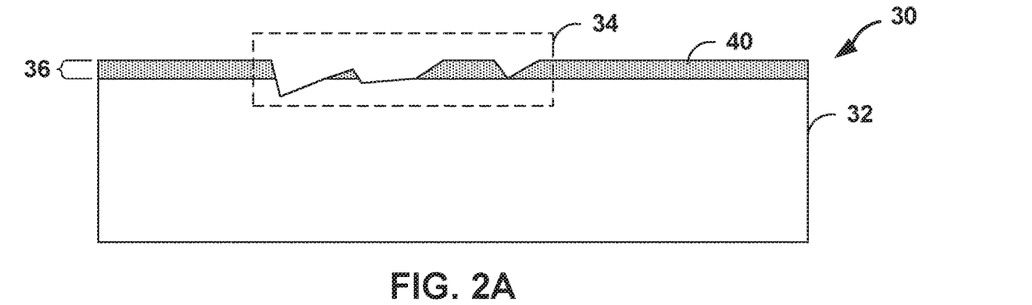
FIGS. 2A-2D are conceptual diagrams illustrating stages of an example technique to repair of a component.
Figure 2B:
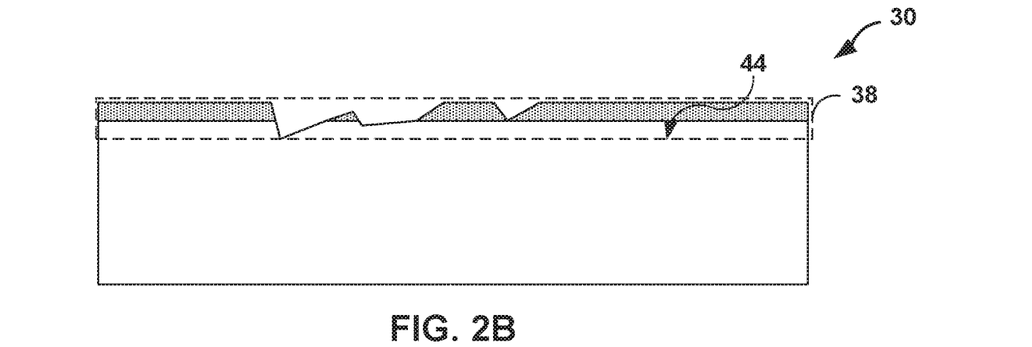
Figure 2C:
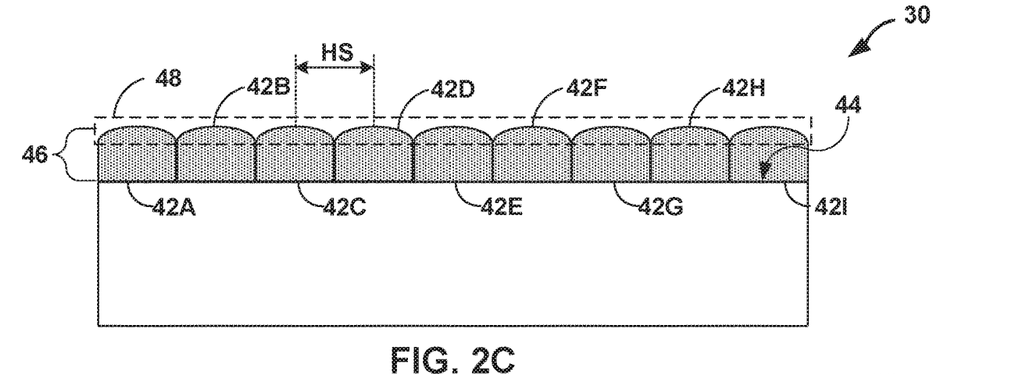

FIGS. 2A-2C are conceptual diagrams illustrating stages of an example technique to repair a component 30. Component 30 may be the same as or substantially similar to component 22 described above in reference to FIG. 1. Although the example of FIGS. 2A-2C are described with respect to repairing existing component 30, similar techniques could be used to fabricate a new component or add a feature to an existing component.

As illustrated in FIG. 2A, component 30 includes a substrate 32 defining a surface 40 having a damaged region 34. In some examples, damaged region 34 may include damage to a case-hardened portion 36 of component 30. In some examples, damaged region 34 may extend through a case-hardened portion 36 of component 30. As described above, damaged region 34 may result from the operation of component 30 due to operating conditions. After identifying damaged region 34, a portion of component 30 may be machined to remove the damage.

FIG. 2B illustrates a sacrificial region 38 that may be removed by machining. Machining may include but is not limited to grinding, turning, electrical discharge machining, grit blasting, or shaping of the surface. Removing sacrificial region 38 may remove irregular surfaces, such as damaged region 34, from surface 40 of component 30. Although illustrated as removing material adjacent to damaged region 34, in some examples, only material within damaged region 34 or directly adjacent damaged region 34 may be removed. In some examples, removal of material adjacent to damaged region 34 may expose a prepared surface 44 configured to receive material via additive manufacturing process. In some examples, additional surface preparation may be performed after machining, such as, for example, cleaning the machined region. After removing sacrificial region 38 and optionally cleaning the exposed surface, material may be added by additive manufacturing, for example, using system 10 describe in reference to FIG. 1A.

Figure 2D:
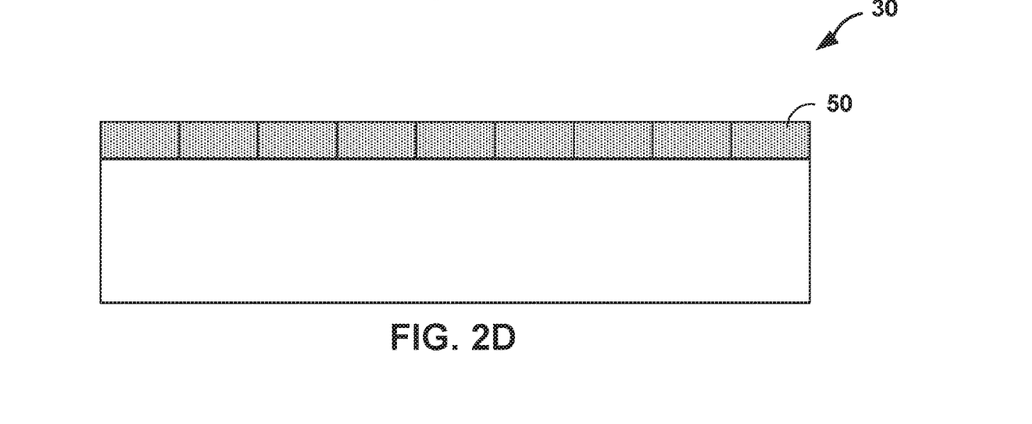

FIG. 2C illustrates a plurality of tracks 42A-42I (collective, "tracks 42") deposited onto prepared surface 44 of component 30. Tracks 42 may be deposited onto prepared surface 44 to define layer 46. Although illustrated as a single layer 46, in some examples, a plurality of layers (each having one or more tracks) may be deposited to define a three-dimensional geometry of a repaired region 50 (FIG. 2D). As discussed above, adjacent tracks 23 may define a hatch spacing HS, which may include a distance between a center point of the width of each track of tracks 42.

After depositing tracks 42, component 30 may be machined to define a final shape of component 30. FIG. 2D illustrates component 30 after machining excess deposited filler material from repaired region 50 to define a final shape of component 30.

Figure 3:
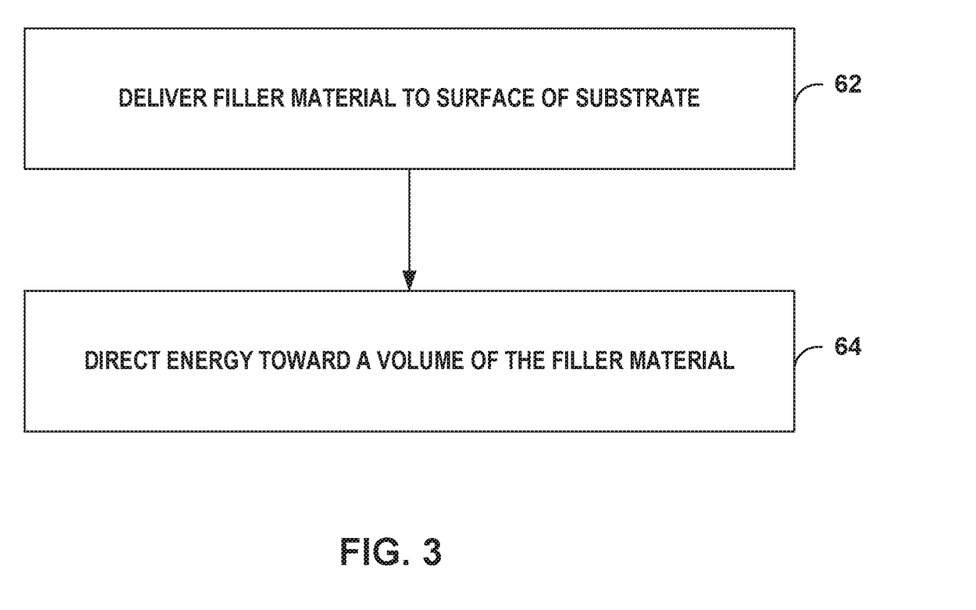
FIG. 3 is a flow diagram illustrating an example technique for additive manufacturing.

FIG. 3 is a flow diagram illustrating an example technique for additive manufacturing. The example technique of FIG. 3 may be performed by example system 10 of FIG. 1A, and is described in some examples below with reference to example system 10 of FIG. 1A. However, in some examples, one or more steps of the example technique of FIG. 3 may be performed by other example systems described in the disclosure.

The technique illustrated in FIG. 3 includes delivering, by material delivery device 14, filler material 20 to surface 24 of substrate 26 (62). As discussed above, substrate 26 may include a ferrous metal or alloy, and filler material 20 includes a ferrous metal or alloy and a carbon-based material. The ferrous metal or alloy of substrate 26 may be the same as or different than the ferrous metal or alloy of filler material 20. In some examples, delivering filler material 20 (62), may include controlling, for example, by computing device 12, a material flux of filler material 20. Controlling the material flux of filler material 20 may include controlling a feed rate of the metal or alloy of filler material 20, controlling a feed rate of the carbon-based material of filler material 20, or both. For example, the feed rate may include a powder feed rate, a wire feed rate, or a gas (e.g., carrier gas) feed rate. In some examples, delivering filler material 20 (62), may include controlling, for example, by computing device 12, a standoff distance of material delivery device 14. In some examples, delivering filler material 20 (62), may include controlling, for example, by computing device 12, a weight percent of an additive mixed into filler material 20.

The technique illustrated in FIG. 3 includes directing, by energy delivery device 25, energy 27 toward a volume of filler material 20 to join at least some of filler material 20 to substrate 26 to form component 22 (64). In some examples, directing energy 27 (64) may include controlling, by computing device 12, energy delivery device 25 to control at least one of the instantaneous power, peak power or intensity, power pulsing, average beam power, a peak beam power density, a beam heat input, travel speed, wavelength, direction, or orientation of the energy delivery head (collectively, the "energy delivery device 25 control parameters"). In some examples, controlling the energy delivery device 25 control parameters may affect one or more of an area of energy incident on surface 24 (e.g., an energy spot size), a flux of energy per unit area incident on surface 24 (e.g., an energy spot power), a rate of heating of filler material 20 and/or substrate 26, a rate of cooling of filler material 20 and/or substrate 26, and/or a rate of material accumulation on surface 24 (e.g., a build-rate). For example, a power of energy 27 may be maintained between about 50 W and about 1000 W. An energy spot size may be selected to achieve a peak power density on the order of about $10^3$ W/cm$^2$ to about $10^6$ W/cm$^2$. Travel speed may be selected to limit linear heat input to between about 1 J/mm to about 500 J/mm, where heat input is the ratio of the laser power in Watts to the travel speed in mm/s. In some examples, controlling the energy delivery device 25 control parameters may affect the microstructure, mechanical properties, and/or hardness of the deposited filler material 20.

In some examples, directing energy 27 (64) may include controlling, by computing device 12, energy delivery device 25 to advance energy 27 along a first path to form an advancing molten pool on substrate 26. Computing device 12 may control energy delivery device 25 to direct energy 27 to lead, accompany, or lag delivered filler material 20. For example, in some examples, filler material 20 may be delivered to surface 24 before energy 27 melts a leading front along the first path to form the leading edge of the advancing molten pool. In some examples, filler material 20 may be delivered to surface 24 simultaneously with the incidence of energy 27 on substrate 26. In some examples, filler material 20 may delivered to surface 24 at a region along the first path after energy 27 has formed the advancing molten pool. In some examples, filler material 20 may combine with the advancing molten pool to form tracks 23.

In some examples, the technique of FIG. 3 may further include controlling, by computing device 12, a cooling rate of tracks 23, by controlling material delivery device 14 and/or energy delivery device 25. In some examples, the cooling rate may regulate the resultant microstructure to avoid or limit flaws in the microstructure while still providing target mechanical properties or hardness. Flaws to be avoided may include lack of fusion, pores, and cracks. In some examples, by controlling the temperature of at least a portion of component 22, computing device 12 may be configured to control mechanical and chemical properties, which ultimately may impact metallurgical properties such as hardness, shear and tensile stress, work hardening, grain size and boundaries, rigidity, and stiffness of the repaired portion of component 22. For example, computing device 12 may be configured to control of the temperature of tracks 23 and/or substrate 26 to control a heat treatment process of tracks 23, which may affect the microstructure of the at least a portion of component 22. Computing device 12 may be configured to control of the temperature of tracks 23 and/or substrate 26 to control a heat treatment process of the at least a portion of component 22 to substantially reproduce (e.g., reproduce or nearly reproduce) the originally manufactured physical properties of component 22 by producing a predetermined microstructure, physical properties, and/or hardness. For example, the microstructure may be substantially the same as the original portion of the component being repaired or may be a microstructure resulting in substantially the same material physical properties as the original portion of component 22.

In some examples, the technique may include controlling material delivery device 14 and energy delivery device 25 to form a plurality of tracks 23. Tracks 23 may define a layer. In some examples, the technique may include controlling material delivery device 14 and energy delivery device 25 to form a plurality of layers. In some examples, the technique illustrated in FIG. 3 may include controlling, by computing device 12, a pause time between forming each track of tracks 23. For example, the pause time may be between about 0.1 seconds to about 200 seconds. In some examples, the technique illustrated in FIG. 3 may include, by computing device 12, controlling a hatch spacing between each track of tracks 23. For example, the hatch spacing may be between 0.001 inches and 1 inch. In some examples, controlling the pause time and/or controlling the hatch spacing may control cooling rate by regulating one or more of a molten pool temperature, a subsurface temperature of a subsurface region of substrate 26, and a surface temperature of surface 24.

The technique illustrated in FIG. 3 may include optional preparatory or pre-processing steps. In some examples, before delivering filler material 20 (62), the technique may include removing a damaged portion of substrate 26 to expose surface 24 of substrate 26. For example, the technique may optionally include machining substrate to expose surface 24 or any surface suitable for subsequent deposition of filler material 20. In some examples, a shape of the machined surface 24 may provide a line of sight for energy beam 27 and for delivery of filler material 20. In some examples, before delivering filler material 20 (62), the technique may include cleaning substrate 26 and/or surface 24 to remove oils, contaminants, coatings, or other material that may interfere with deposition of filler material 20. In some examples, component 22 may be preheated.

The technique illustrated in FIG. 3 may include optional post-processing steps. In some examples, after joining at least some of filler material 20 to substrate 26, the technique may include heat treating component 22 to case-harden the joined filler material 20. In some examples, after joining at least some of filler material 20 to substrate 26, the technique may include restoring component 22 to final dimensions. For example, after joining at least some of filler material 20 to substrate 26, the technique may include machining, plating, and/or coating the joined filler material to define final dimensions of component 22. In some examples, after joining at least some of filler material 20 to substrate 26, the technique may include surface finishing, such as, for example, shot peening, laser shock peening, and isotropic super-finishing the joined filler material to provide a finished surface on component 22.

The techniques described in this disclosure may be implemented, at least in part, in hardware, software, firmware, or any combination thereof. For example, the technique may be performed using computer software and hardware configured to determine process parameters, tool path design, or both as a function of time based on data obtained through process monitoring and/or process modeling to deposit ferrous metals or alloys, such as case hardened ferrous metals or alloys, via additive manufacturing. In some examples, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

The following clauses illustrate example subject matter described herein.

Clause 1. A method comprising: delivering, by a material delivery device, a filler material to a surface of a substrate, wherein the substrate comprises a first ferrous metal, wherein the filler material comprises a second ferrous metal and a carbon-based material; and directing, by an energy delivery device, an energy toward a volume of the filler material to join at least some of the filler material to the substrate to form a component.

Clause 2. The method of clause 1, further comprising, before delivering the filler material, removing a damaged portion of the substrate to expose the surface of the substrate.

Clause 3. The method of clause 1 or 2, wherein the first ferrous metal is different than the second ferrous metal.

Clause 4. The method of any one of clauses 1 through 3, wherein the first ferrous metal comprises about 0.01 weight percent (wt %) to about 1.5 wt % carbon, about 0.01 wt % to about 15.0 wt % chromium, about 0.1 wt % about 20 wt % cobalt, about 0.1 wt % to about 2 wt % manganese, about 0.1 wt % to about 8 wt % molybdenum, about 0.1 wt % to about 25 wt % nickel, and about 0.1 wt % to about 2 wt % vanadium.

Clause 5. The method of any one of clauses 1 through 4, wherein the second ferrous metal comprises powdered alloy steel 9310.

Clause 6. The method of any one of clauses 1 through 5, wherein the filler material comprises an additive including at least one of chromium, cobalt, manganese, molybdenum, nickel, or vanadium.

Clause 7. The method of any one of clauses 1 through 6, wherein the carbon-based material comprises a graphite powder.

Clause 8. The method of any one of clauses 1 through 7, wherein the carbon-based material comprises a carbonaceous gas.

Clause 9. The method of clause 8, wherein the carbonaceous gas is a carrier gas of the material delivery device.

Clause 10. The method of any one of clauses 1 through 9, wherein a hardness of the component is between about 55 Rockwell C scale hardness (HRC) and 65 HRC.

Clause 11. The method of any one of clauses 1 through 10, further comprising, after joining at least some of the filler material to the substrate, heat treating the component to case-harden the joined filler material.

Clause 12. The method of any one of clauses 1 through 11, further comprising, after joining at least some of the filler material to the substrate, at least one of restoring final dimensions of the component or surface finishing the component.

Clause 13. The method of any one of clauses 1 through 12, wherein the carbon-based material is between about 1 wt % to about 20 wt % of the filler material.

Clause 14. An additive manufacturing system comprising: an energy delivery device; a material delivery device; and a computing device, wherein the computing device is configured to: control the material delivery device to deliver a filler material to a surface of a substrate, wherein the substrate comprises a first ferrous metal, and wherein the filler material comprises a second ferrous metal and a carbon-based material; and control the energy delivery device to direct an energy beam toward a volume of the filler material to join at least some of the filler material to the substrate to form a component.

Clause 15. The system of clause 14, wherein the first ferrous metal is different than the second ferrous metal.

Clause 16. The system of clause 14 or 15, wherein the second ferrous metal comprises powdered alloy steel 9310.

Clause 17. The system of any one of clauses 14 through 16, wherein the carbon-based material comprises a graphite powder.

Clause 18. The system of any one of clauses 14 through 17, wherein the material delivery device comprises a first material delivery device and a second material delivery device, wherein the computer is configured to: control the first material delivery device to deliver the second ferrous metal to the surface of the substrate; and control the second material delivery device to deliver the carbon-based material to the surface of the substrate.

Clause 19. The system of any one of clauses 14 through 18, wherein the carbon-based material comprises a carbonaceous gas, and wherein the carbonaceous gas is a carrier gas of the material delivery device.

Clause 20. A component comprising: a substrate defining a surface, wherein the substrate comprises a first ferrous metal; and a layer of filler material deposited directly on the surface of the substrate, wherein the filler material comprises a second ferrous metal and carbon from a carbon-based material.

Various examples have been described. These and other examples are within the scope of the following claims.

What is claimed is:

1. A method comprising:
removing a damaged portion of a substrate to form an exposed surface of the substrate, wherein the damaged portion removed from the substrate includes a case hardened material, delivering, by a material delivery device, a filler material to the exposed surface of a substrate, wherein the substrate comprises a first ferrous material, wherein the filler material comprises a second ferrous material and a carbon-based material;

directing, by an energy delivery device, an energy toward a volume of the filler material to join at least some of the filler material to the exposed substrate to form a component, wherein the joined filler material replaces the case hardened material of the damaged portion of the substrate; and heat treating the at least some filler material joined to the substrate to case-harden a layer, wherein heat treating the at least some filler material joined to the substrate to case-harden the layer includes directed laser hardening of the at least some filler material joined to the substrate with the energy delivery device to case-harden the layer.

2. A method comprising:
removing a damaged portion of a substrate to form an exposed surface of the substrate, wherein the damaged portion removed from the substrate includes a case hardened material, depositing, using a laser directed energy deposition process, a plurality of tracks on the exposed surface of the substrate to form at least a portion of a component, the substrate comprising a first ferrous material, wherein depositing the plurality of tracks on the exposed surface includes:
   directing, by a material delivery device, a second ferrous material and a carbon-based material to the exposed surface of the substrate, wherein the second ferrous material is directed to the exposed surface of the substrate by the material delivery device in the form of a wire filament or in the form a powder blown to the surface of the substrate with a carrier gas, and
   directing, by a laser, an energy toward a volume of the second ferrous material to join at least some of the second ferrous material and the carbon-based material to the exposed surface of the substrate to form a respective track of the plurality of tracks; and heat treating the respective track of the plurality of tracks joined to the exposed surface of the substrate to case-harden the respective track of the plurality of tracks, wherein the respective track at least partially replaces the case hardened material of the damaged portion of the substrate.

3. The method of claim 2, wherein the first ferrous material of the substrate is different than the second ferrous material.

4. The method of claim 2, wherein the first ferrous material comprises iron, about 0.01 weight percent (wt %) to about 1.5 wt % carbon, about 0.01 wt % to about 15.0 wt % chromium, about 0.1 wt % about 20 wt % cobalt, about 0.1 wt % to about 2 wt % manganese, about 0.1 wt % to about 8 wt % molybdenum, about 0.1 wt % to about 25 wt % nickel, and about 0.1 wt % to about 2 wt % vanadium.

5. The method of claim 2, wherein the second ferrous material comprises powdered alloy steel 9310.

6. The method of claim 2, wherein the plurality of deposited tracks comprises an additive including at least one of chromium, cobalt, manganese, molybdenum, nickel, or vanadium.

7. The method of claim 2, wherein the carbon-based material comprises a graphite powder.

8. The method of claim 2, wherein the carbon-based material comprises a carbonaceous gas.

9. The method of claim 8, wherein the carbonaceous gas is the carrier gas of the material delivery device for delivering the second ferrous material.

10. The method of claim 2, wherein a hardness of the joined second ferrous material and the carbon-based material is between about 55 Rockwell C scale hardness (HRC) and 65 HRC.

11. The method of claim 2, further comprising, after depositing the plurality of tracks on the exposed surface of the substrate, at least one of restoring the component to a dimension of the component before the damage portion to the component or surface finishing the component.

12. The method of claim 2, wherein the carbon-based material is between about 1 wt % to about 20 wt % of the plurality of deposited tracks.

13. The method of claim 1, wherein the at least some filler material joined to the substrate includes pure carbon from the carbon-based material.

14. The method of claim 1, wherein the case-hardened layer includes iron carbide formed from the second ferrous material and the carbon-based material delivered to the exposed portion of the substrate by the material delivery device, wherein the iron carbide is formed by delivery of the second ferrous material and the carbon-based material and the directing the energy by the energy delivery device.

15. The method of claim 2, wherein heat treating the respective track of the plurality of tracks joined to the exposed surface of the substrate to case-harden the respective track includes carburizing the at least some filler material joined to the substrate to case-harden the respective track.

16. The method of claim 2, wherein heat treating the respective track of the plurality of tracks joined to the exposed surface of the substrate to case-harden the respective track includes directed laser hardening of the respective track of the plurality of tracks joined to the exposed surface of the substrate with the laser to case-harden the respective track of the plurality of tracks.

17. The method of claim 1, wherein the second ferrous material is delivered to the exposed surface of the substrate in a powder form, and wherein the carbon-based material is delivered to the exposed surface of the substrate in gaseous form as a carrier gas used by the material delivery device to deliver the powder form of the second ferrous material.

* * * * *